United States Patent
Kim et al.

(10) Patent No.: US 9,807,682 B2
(45) Date of Patent: Oct. 31, 2017

(54) METHOD AND DEVICE FOR RECEIVING DATA UNIT

(71) Applicant: LG ELECTRONICS INC., Seoul (KR)

(72) Inventors: Jeongki Kim, Seoul (KR); Suhwook Kim, Seoul (KR); Yongho Seok, Seoul (KR); Hangyu Cho, Seoul (KR); Kiseon Ryu, Seoul (KR); Giwon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 14/906,821

(22) PCT Filed: Aug. 1, 2014

(86) PCT No.: PCT/KR2014/007145
§ 371 (c)(1),
(2) Date: Jan. 21, 2016

(87) PCT Pub. No.: WO2015/016684
PCT Pub. Date: Feb. 5, 2015

(65) Prior Publication Data
US 2016/0165524 A1    Jun. 9, 2016

Related U.S. Application Data

(60) Provisional application No. 61/861,433, filed on Aug. 2, 2013.

(51) Int. Cl.
*H04J 11/00* (2006.01)
*H04W 48/16* (2009.01)
(Continued)

(52) U.S. Cl.
CPC ......... *H04W 48/16* (2013.01); *H04L 27/2602* (2013.01); *H04W 52/02* (2013.01); *H04W 84/12* (2013.01)

(58) Field of Classification Search
CPC ........................... H04W 76/023; H04W 72/04
(Continued)

(56) References Cited

U.S. PATENT DOCUMENTS

2008/0159209 A1    7/2008 Kim
2010/0002627 A1    1/2010 Ngo et al.
(Continued)

FOREIGN PATENT DOCUMENTS

KR    10-2009-0044970    5/2009
KR    10-2013-0062365    6/2013

OTHER PUBLICATIONS

PCT International Application No. PCT/KR2014/007145, Written Opinion of the International Searching Authority dated Nov. 6, 2014, 1 page.

*Primary Examiner* — Iqbal Zaidi
(74) *Attorney, Agent, or Firm* — Lee Hong Degerman Kang Waimey

(57) ABSTRACT

Method and device for receiving a data unit are disclosed. A method for receiving a PPDU including a PPDU header and a data field of an STA may comprise the step of: an STA receiving the PPDU header from an AP; the STA determining whether the PPDU transfers a scanning frame on the basis of the PPDU header; and the STA determining whether to decode the data field on the basis of whether to perform a scanning procedure and whether the PPDU transfers the scanning frame.

13 Claims, 14 Drawing Sheets

(51) Int. Cl.
  *H04W 52/02*  (2009.01)
  *H04L 27/26*  (2006.01)
  *H04W 84/12*  (2009.01)
(58) Field of Classification Search
  USPC .................................................. 370/328–339
  See application file for complete search history.

(56) References Cited

U.S. PATENT DOCUMENTS

2013/0230035 A1* 9/2013 Grandhi ................ H04W 48/16
                                                     370/338
2014/0286226 A1* 9/2014 Seok .................... H04W 56/00
                                                     370/312
2015/0351084 A1* 12/2015 Werb .................... H04W 12/08
                                                     370/329

* cited by examiner

FIG. 1
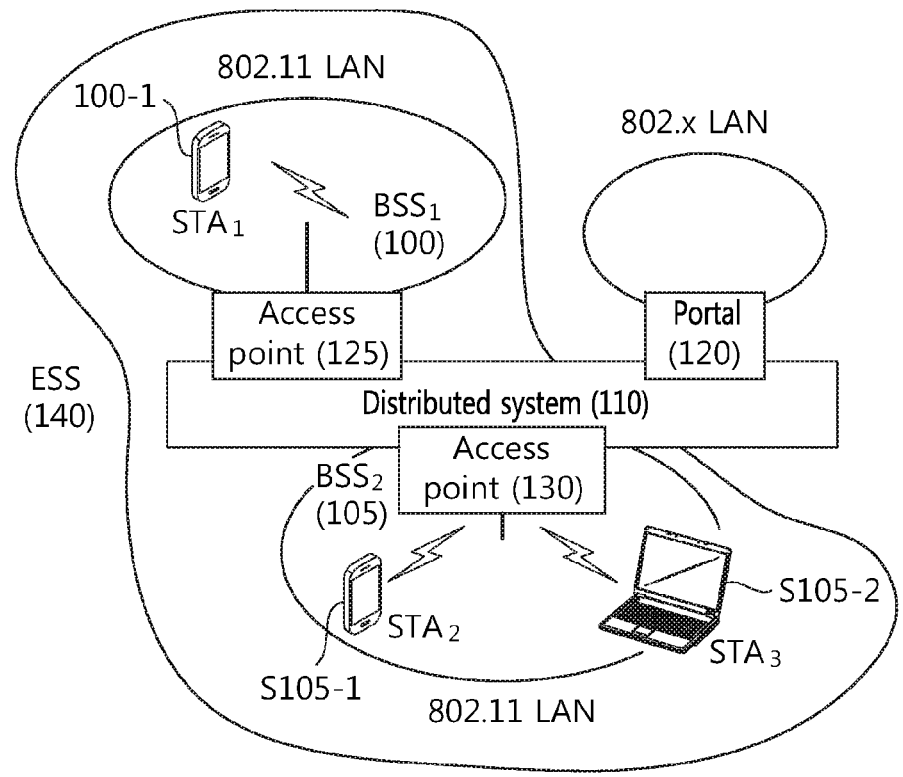
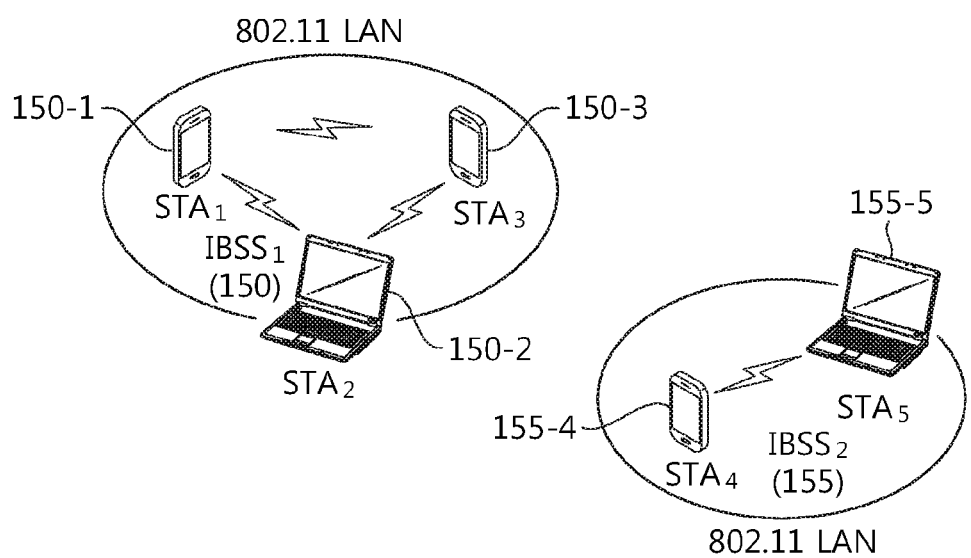

METHOD AND DEVICE FOR RECEIVING DATA UNIT

CROSS-REFERENCE TO RELATED APPLICATIONS

This application is the National Stage filing under 35 U.S.C. 371 of International Application No. PCT/KR2014/007145, filed on Aug. 1, 2014, which claims the benefit of U.S. Provisional Application No. 61/861,433, filed on Aug. 2, 2013, the contents of which are all hereby incorporated by reference herein in their entirety.

BACKGROUND OF THE INVENTION

Field of the invention

The present invention relates to wireless communications, and more particularly, to a method and apparatus for receiving a data unit in wireless local area network (WLAN).

Related Art

A Wireless Next Generation Standing Committee (WNG SC) of institute of electrical and electronic engineers (IEEE) 802.11 is an AD-HOC committee that a next-generation wireless local area network (WLAN) in the medium and long term.

In an IEEE conference in March 2013, Broadcom presented the need of discussion of the next-generation WLAN after IEEE 802.11ac in the first half of 2013 when an IEEE 802.11ac standard is finished based on a WLAN standardization history. A motion for foundation of a study group which Orange and Broadcom proposed in the IEEE conference in March 2013 and most members agreed has been passed.

A scope of a high efficiency WLAN (HEW) which the next-generation WLAN study group primarily discusses the next-generation study group called the HEW includes 1) improving a 802.11 physical (PHY) layer and a medium access control (MAC) layer in bands of 2.4 GHz and 5 GHz, 2) increasing spectrum efficiency and area throughput, 3) improving performance in actual indoor and outdoor environments such as an environment in which an interference source exists, a dense heterogeneous network environment, and an environment in which a high user load exists, and the like. That is, the HEW operates at 2.4 GHz and 5 GHz similarly to the existing WLAN system. A primarily considered scenario is a dense environment in which access points (APs) and stations (STAs) are a lot and under such a situation, improvement of the spectrum efficiency and the area throughput is discussed. In particular, in addition to the indoor environment, in the outdoor environment which is not considerably considered in the existing WLAN, substantial performance improvement is concerned.

In the HEW, scenarios such as wireless office, smart home, stadium, Hotspot, and building/apartment are largely concerned and discussion about improvement of system performance in the dense environment in which the APs and the STAs are a lot is performed based on the corresponding scenarios.

In the future, in the HEW, improvement of system performance in an overlapping basic service set (OBSS) environment and improvement of outdoor environment performance, and cellular offloading are anticipated to be actively discussed rather than improvement of single link performance in one basic service set (BSS). Directionality of the HEV means that the next-generation WLAN gradually has a technical scope similar to mobile communication. When a situation is considered, in which the mobile communication and the WLAN technology haven been discussed in a small cell and a direct-to-direct (D2D) communication area in recent years, technical and business convergence of the next-generation WLAN and the mobile communication based on the HEW is predicted to be further active.

SUMMARY OF THE INVENTION

An object of the present invention is to provide a method for receiving a data unit.

Another object of the present invention is to provide an apparatus for performing a method for receiving a data unit.

In an aspect, a method for receiving a physical layer (PHY) protocol data unit (PPDU) that includes a PPDU header and a data field performed by a station (STA) may include receiving, by the STA, the PPDU header from an access point (AP), determining, by the STA, whether the PPDU carries a scanning frame based on the PPDU header, and determining, by the STA, whether to perform decoding the data field based on whether to perform a scanning procedure and whether the PPDU carries the scanning frame.

In another aspect, a station (STA) for receiving a physical layer (PHY) protocol data unit (PPDU) that includes a PPDU header and a data field may include a radio frequency (RF) unit implemented to transmit and receive a wireless signal, and a processor selectively connected to the RF unit, wherein the processor is configured to perform, receiving the PPDU header from an access point (AP), determining whether the PPDU carries a scanning frame based on the PPDU header, and determining whether to perform decoding the data field based on whether to perform a scanning procedure and whether the PPDU carries the scanning frame.

Unnecessary power consumption of the STA will be reduced without decoding procedure for the data unit transferring unnecessary scanning frame transmitted via wireless medium.

BRIEF DESCRIPTION OF THE DRAWINGS

FIG. 1 is a concept view illustrating the structure of a wireless local area network (WLAN).

DESCRIPTION OF EXEMPLARY EMBODIMENTS

FIG. 1 is a concept view illustrating the structure of a wireless local area network (WLAN).

An upper part of FIG. 1 shows the structure of the IEEE (institute of electrical and electronic engineers) 802.11 infrastructure basic service set (BSS).

Referring to the upper part of FIG. 1, the WLAN system may include one or more infrastructure basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the BSS as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set), IBSS.

A lower part of FIG. 1 is a concept view illustrating an IBSS.

Referring to the lower part of FIG. 1, the IBSS is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
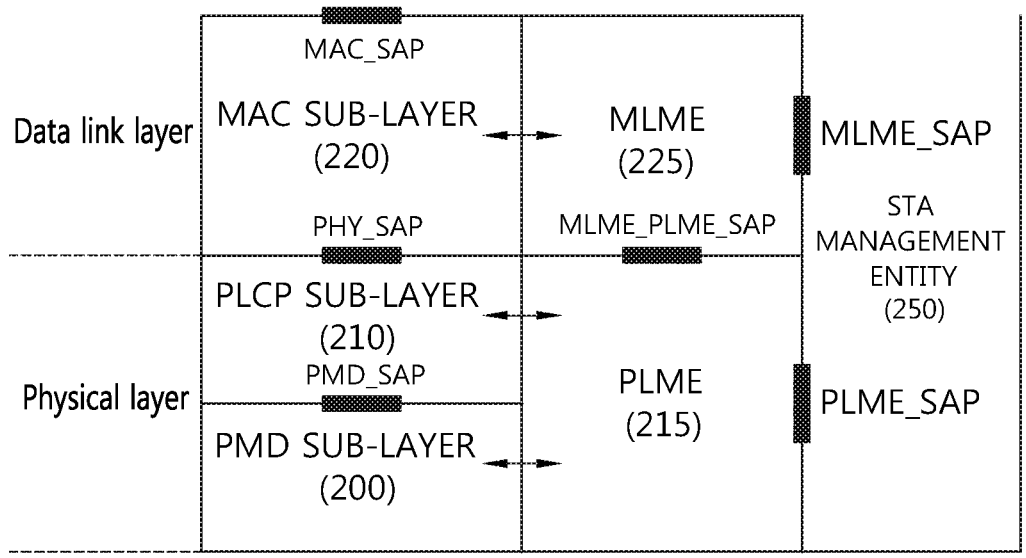
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
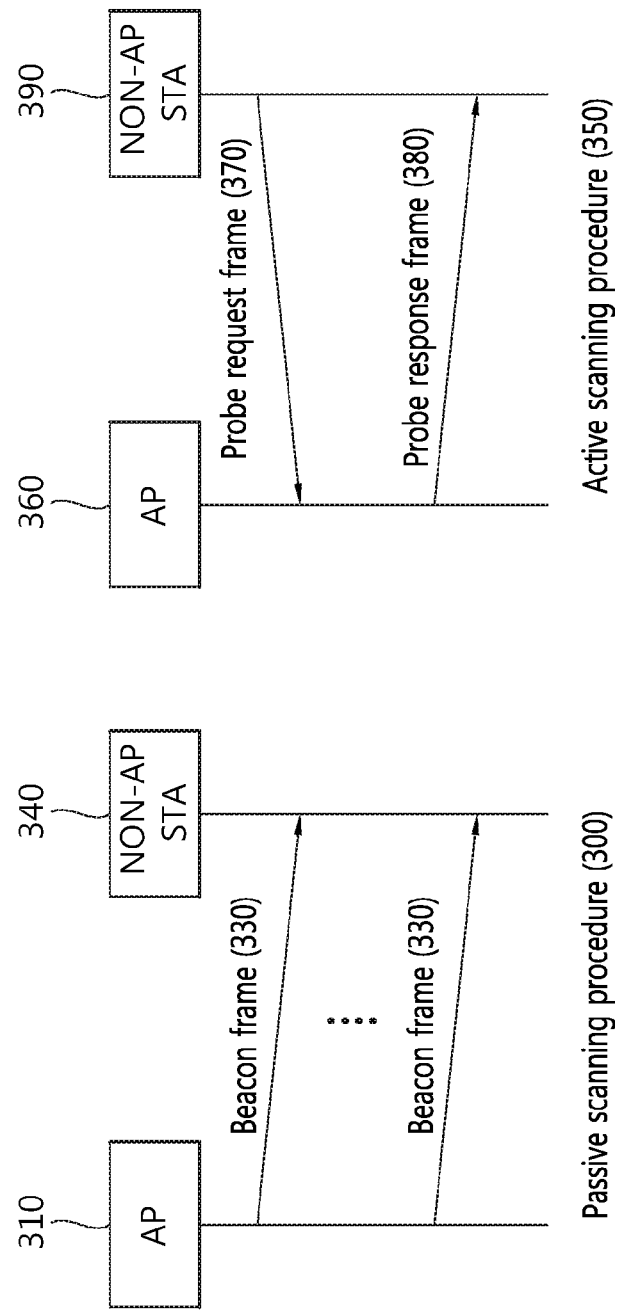
FIG. 3 is a concept view illustrating a scanning method in a WLAN.

FIG. 3 is a concept view illustrating a scanning method in a WLAN.

Referring to FIG. 3, the scanning method may be divided into passive scanning 300 and active scanning 350.

Referring to a left part of FIG. 3, the passive scanning 300 may be performed by a beacon frame 330 that is periodically broadcast from the AP 310. The AP 310 in the WLAN broadcasts the beacon frame 330 to the non-AP STA 340 at a particular period (e.g., per 100 msec). The beacon frame 330 may contain information on the current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without the need for the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased compare to the active scanning method. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011. IEEE 802.11 ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Also, an FILS discovery frame may be defined. The FILS discovery frame is a frame transmitted between each of the transmission periods in each AP, may be a frame transmitted with a shorter period than the beacon frame. That is, the FILS discovery frame is a frame transmitted with a shorter period than a transmission period of the beacon frame. The FILS discovery frame may include identification information (SSID and BSSID) of an AP that transmits a search frame. It may be implemented that the FILS discovery frame is transmitted to an STA before the beacon frame is transmitted, and thus, the STA may search that an AP is exited in the corresponding channel beforehand. An interval of which the FILS discovery frame is transmitted in one AP is referred to as an FILS discovery frame transmission interval. The FILS discovery frame may be transmitted with a part of information included in the beacon frame being included.

Referring to a right part of FIG. 3, the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision, and the AP 360 then includes network information in a frame response frame 380, then sending the same to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

Figure 4:
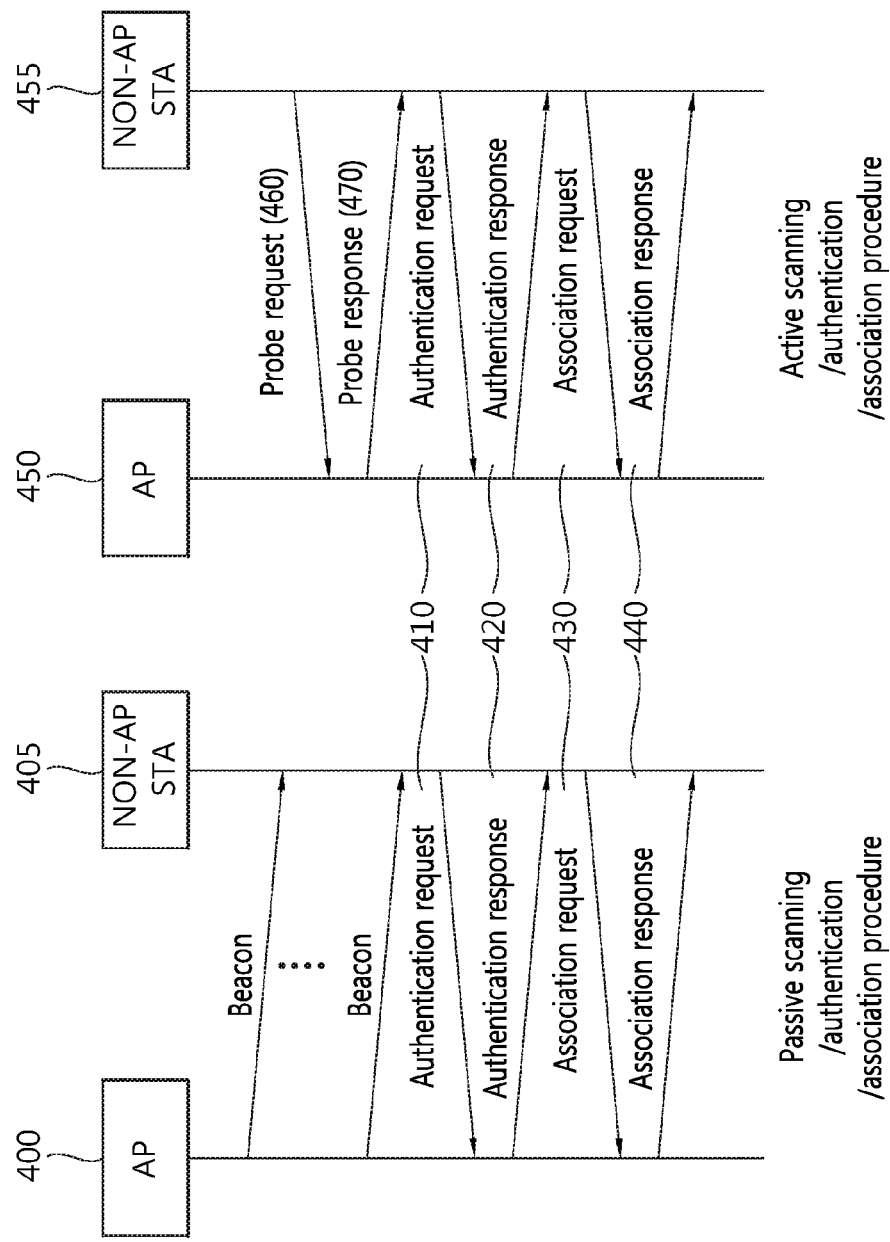
FIG. 4 is a concept view illustrating an authentication and association procedure after scanning between an AP and an STA.

FIG. 4 is a concept view illustrating an authentication and association procedure after scanning between an AP and an STA.

Referring to FIG. 4, after passive/active scanning, the authentication and association may be conducted with one of the scanned APs.

The authentication and association procedure may be carried out by way of, e.g., 2-way handshaking. A left part of FIG. 4 is a concept view illustrating an authentication and association procedure after passive scanning, and a right part of FIG. 4 is a concept view illustrating an authentication and association after active scanning.

The authentication and association procedure may be equally performed by exchanging an authentication request frame 410/authentication response frame 420 and an association request frame 430/association response frame 440 between the AP 400 or 450 and the non-AP STA 405 or 455 regardless of which one of the active scanning method and the passive scanning method has been used.

The authentication procedure may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

In the association process, the non-AP STA 405 or 455 may transmit the association request frame 430 to the AP 400 or 405. In response to the association request frame 430, the AP 400 or 450 may transmit the association response frame 440 to the non-AP STA 405 or 455. The transmitted association request frame 430 contains information on the capability of the non-AP STA 405 or 455. Based on the information on the capability of the non-AP STA 405 or 455, the AP 400 or 450 may determine whether the non-AP STA 405 or 455 may be supported. In case that such support is available, the AP 400 or 450 may transmit the association response frame 440 to the non-AP STA 405 or 455. The association response frame 440 may include whether the association request frame 440 is accepted or no, and the reason for the acceptance, and its supportable capability information. The association frame format is set forth in IEEE 802.11 chapters 8.3.3.5/8.3.3.6.

After the association process is performed between the AP and the non-AP, normal data transmission and reception may be performed between the AP and the non-AP. In case that the association process between the AP and the non-AP is failed, the association process may be performed again on the reason why the association is failed, or association with other AP may be performed.

Figure 5:
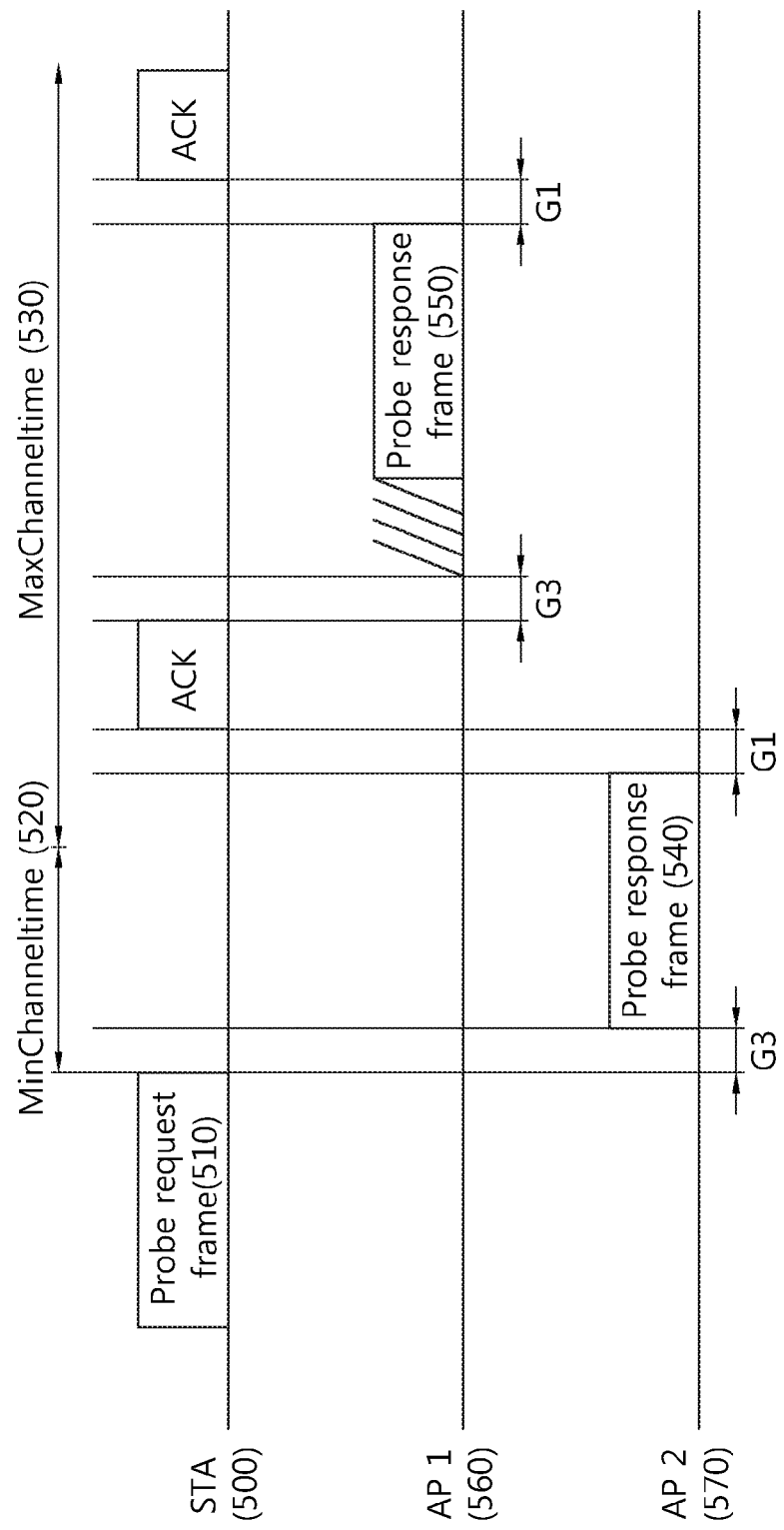
FIG. 5 is a concept view illustrating an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

For example, the STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) STA(500) can generate the probe request frame including information for specifying the APs 560 and 570 included in MLME-SCAN.request primitive (for example, SSID (service set identification) and BSSID (basic service set identification) information).

The BSSID may have a value corresponding to the MAC address of the AP as an indicator to specify the AP. The SSID is a network term for specifying an AP, which may be read by a person who operates the STA. The BSSID and/or SSID may be used to specify an AP.

The STA 500 may transmit a probe request frame to the specified AP1 560 and the AP2 570. The AP1 560 and the AP2 570 that receive the probe request frame 510 may transmit a probe response frame to the STA 500.

The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 6. For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 540 and 550 to the STA 500.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used for performing the operation for changing channels in which the STA 500 performs active scanning. For example, in case that the STA 500 fails to detect the transmission of other frame (e.g., the probe response frame 550 and 560) until the probe timer reaches the minimum channel time 520, the STA 500 shifts scanning channels to perform scanning on other channel. In case that the STA 500 detects the transmission of other frame until the probe timer reaches to the minimum channel time 520, the STA 500 may monitor channels until the probe timer reaches the maximum channel time 530. When the probe timer reaches the maximum channel time 530, the STA may process the received probe response frames 540 and 550.

The STA 500 may search PHY-CCA.indication primitive until the probe timer reaches the minimum channel time 520 and may determine whether other frames received through channel are existed until the minimum channel time 520.

PHY-CCA. indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 540 and 550 received by the STA 500 when PHY-CCA.indication is detected to be busy and may determine that there are no probe response frames 540 and 550 received by the STA 500 when PHY-CCA.indication is detected to be idle.

In case PHY-CCA.indication is detected to be idle, the STA 500 may set a net allocation vector (NAV) to 0, and the STA 500 may scan a next channel. In case PHY-CCA.indication is detected to be busy, the STA 500 may perform a process on the received probe response frames 540 and 550 after the probe timer reaches the maximum channel time 530. After the process on the received probe response frames 540 and 550 is done, the STA 500 may set the net allocation vector (NAV) to 0 and may then scan a next channel.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' 6.3.3.2 MLME-SCAN.request disclosed on November 2011.

Figure 6:
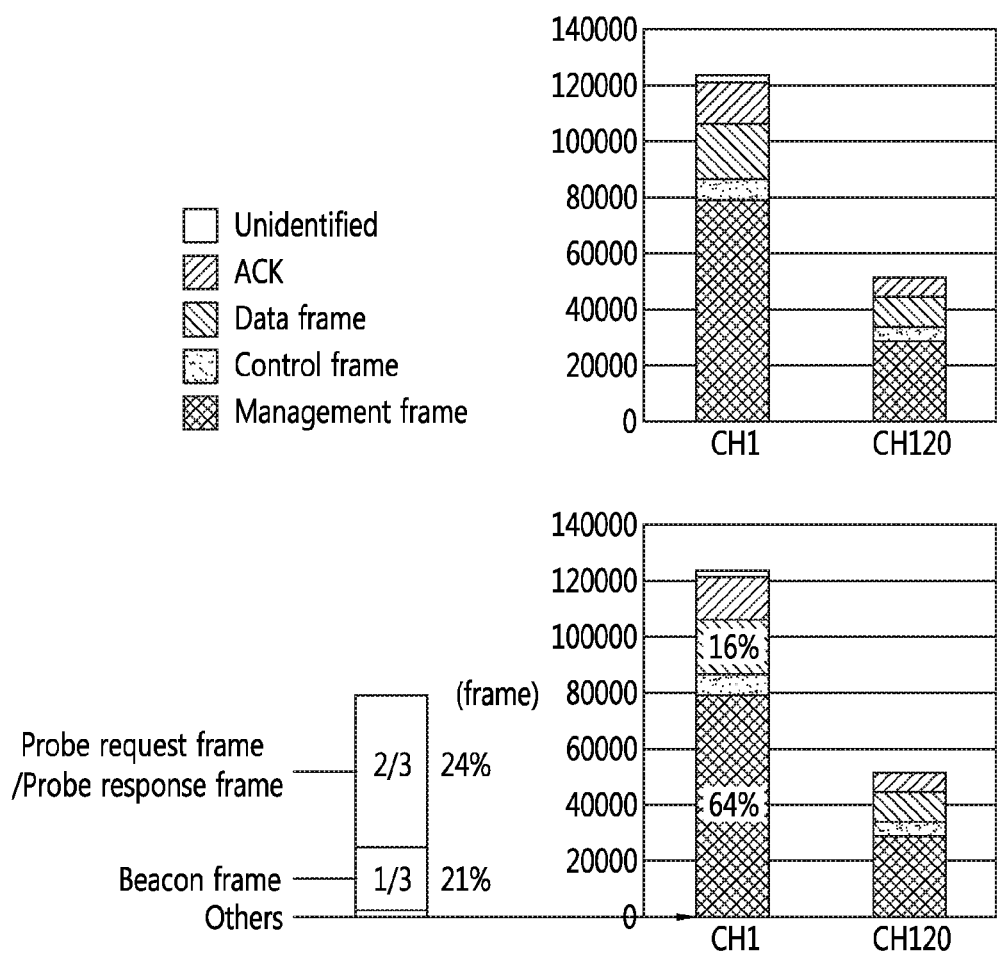
FIG. 6 is a graph illustrating a ratio of frame which is transmitted or received in a wireless local area network (WLAN) environment according to conventional art.

FIG. 6 is a graph illustrating a ratio of frame which is transmitted or received in a wireless local area network (WLAN) environment according to conventional art.

In an upper part of FIG. 6, it is illustrated a graph classifying an entire frame which is monitoring a wireless medium for 5 minutes in a frequency band of 2.4 GHz according to a characteristic of the frame. The entire frame may be classified into one of an acknowledgement (ACK) frame, a data frame, a control frame and a management frame.

Referring to the upper part of graph shown in FIG. 16, the management frame occupies about 65% of the entire frame. That is, the management frame occupies the greater part of the frame which is transmitted or received through a wireless medium in a frequency band of 2.4 GHz.

The graph shown in a lower part of FIG. 6 classifies the management frame which is currently transmitted or received in a frequency band of 2.4 GHz in detail.

Referring to the lower part of graph shown in FIG. 16, about two thirds of the management frame is occupied by probe request frame/probe response frame and about one third of the management frame is occupied by a beacon frame and other management frames.

In a dense WLAN environment, the number of STA and AP increases. Accordingly, the management frame such as the probe request frame/probe response frame or the beacon frame for associating APs and STAs among the entire frame may be more increased.

In case that the management frame increases in the dense WLAN environment, excessive radio resources may be used for transmitting the management frame. In addition, owing to the increase of management frame, unnecessary power consumption of STA may occur. As a particular example, even in case that the management frame does not target an STA, the STA should identify destination addresses of MAC header, frame types or a subframe field types, and so on by decoding up to a MAC header level unnecessarily after receiving a PPDU for the management frame. Owing to such an increase of unnecessary decoding, unnecessary power consumption of STA may occur.

Hereinafter, in the embodiments of the present invention, a method for decreasing an unnecessary MAC header decoding of STA will be described. Hereinafter, the embodiments of the present invention will be described in a standard of IEEE 802.11ax for the convenience of description, and the cases applied to other WLAN standards are included in the scope of the present invention.

Figure 7:
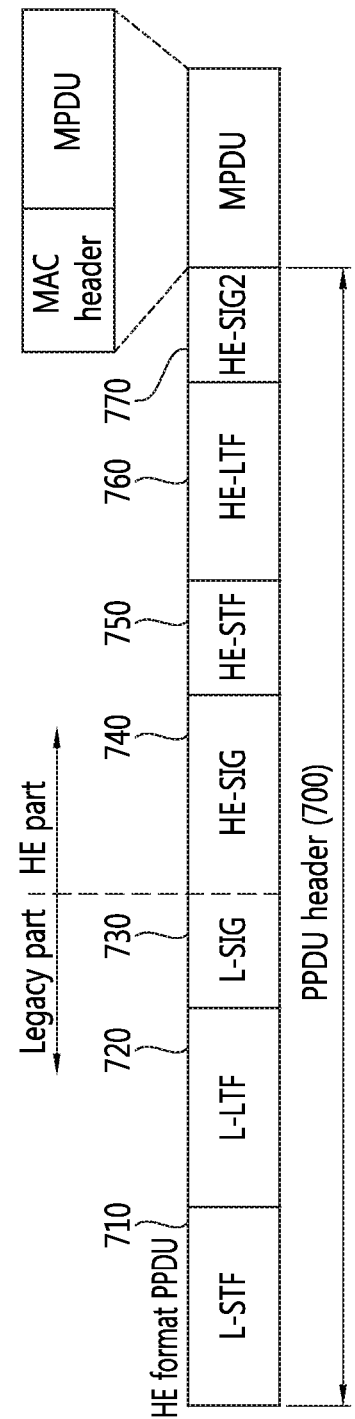
FIG. 7 is a conceptual diagram illustrating a PPDU format according to an embodiment of the present invention.

Referring to FIG. 7, the PPDU header 700 of the HE format PPDU may be distinguished into a legacy part and a HE part. For example, the legacy part may include L-SIG 730 and fields L-STF 710 and L-STF 720 located ahead of L-SIG 730. In addition, the HE part may include fields for supporting 802.11ax such as HE-SIG 740, HE-STF 750, HE-LTF 760 and HE-SIG2 770. The fields for supporting such IEEE 802.11ax may be used for interpreting the HE format PPDU.

FIG. 7 is a conceptual diagram illustrating a PPDU format according to an embodiment of the present invention.

In FIG. 7, a PHY header of a PPDU (hereinafter, a high efficiency (HE) format PPDU) or a scanning frame indicator included in a PHY preamble is described. The PHY header or the PHY preamble may be expressed by a term, a PPDU header 700. In the PPDU, a part except the PHY header may also expressed by an MPDU data field.

In the present invention, the scanning frame may be at least one frame of a beacon frame, a probe request frame and a probe response frame.

Referring to FIG. 7, the PPUD header 700 of the HE format PPDU may be distinguished into a legacy part and a HE part. For example, the legacy part may include L-SIG 730 and fields L-STF 710 and L-STF 720 located ahead of L-SIG 730. In addition, the HE part may include fields for supporting 802.11ax such as HE-SIG 740, HE-STF 750, HE-LTF 760 and HE-SIG2 770. The fields for supporting such IEEE 802.11ax may be used for interpreting the HE format PPDU.

The L-STF 710 of the legacy part may include a short training sequence. The L-STF 710 may be used for frame detection, automatic gain control (AGC), diversity detection and coarse frequency/time synchronization.

The L-LTF 720 of the legacy part may include a long training sequence. The L-LTF 720 may be used for fine frequency/time synchronization and channel anticipation.

The L-SIG 730 of the legacy part may be used for transmitting control information. The L-SIG 730 may include information of data rate and data length.

The HE-SIG 740 of the HE part may include information for various techniques which are supported in an IEEE 802.11ax system. In IEEE 802.11ax, new techniques such as orthogonal frequency division multiple access (OFDMA), uplink (UL) multi-user (MU)-multiple input multiple output (MIMO), and so on which have been not used in the existing WLAN systems. In addition, in the IEEE 802.11ax system, the techniques may be used for improving communication performance in the dense environment where a plurality of APs and a plurality of STAs are existed. Accordingly, in the IEEE 802.11ax system, additional information and/or fields may be defined for other functions than the existing WLAN. The HE-SIG 740 may be defined on two OFDM symbols or extended three OFDM symbols.

The HE-STF 750 may be used for interpreting fields included in the HE format PPDU behind the HE-STF 750. For example, the HE-STF 750 may be used for AGC, diversity detection and coarse frequency/time synchronization.

The HE-LTF 760 may be used for interpreting field transmitted after HE-LTF(760), For example, HE-LTF(760) is used for assumption of channel and accurate frequency/time synchronization.

The HE-SIG2 770 may include additional information for interpreting the HE format PPDU.

The structure of HE format PPDU shown in FIG. 7 is an example. The order and term of the fields of HE format PPDU may be variously determined. In addition, only a part of the fields of the aforementioned field may be included in the HE format PPDU.

According to the embodiments of the present invention, the HE-SIG 740 of the HE format PPDU may include a scanning frame indicator. The scanning frame indicator may indicate whether the frame carried by the PPDU is a frame related to the scanning procedure. The frame related to the scanning procedure may be a frame that is available to be used in the scanning procedure such as a beacon frame and a probe response frame transmitted by an AP or a probe request frame transmitted by an STA, and so on.

In FIG. 7, it is assumed that the scanning frame indicator is included in the HE-SIG 740. However, the scanning frame indicator may represent whether the PPDU delivers the scanning frame by being apparently or inherently included in other field of the PPDU header. Or, it may be indicated whether the scanning frame of PPDU is carried through other fields except the HE-SIG 740 (e.g., L-STF 710, L-LTF 720, HE-LTF 760, HE-STF 750 and L-SIG 730). Hereinafter, for the convenience of description, it is assumed that the scanning frame indicator is included in the HE-SIG 740.

For example, the scanning frame indicator may be information of 1 bit. In case that the scanning frame indicator indicates '0', the scanning frame indicator may indicate that the decoded PPDU is a data unit that carries the scanning frames. On the other hand, in case that the scanning frame indicator indicates '1', the scanning frame indicator may indicate that the PPDU decoded is a data unit that carries non-scanning frames, not the scanning frames.

For another example, the scanning frame indicator may indicate which frame is the decoded PPDU among the scanning frames. In this case, the scanning frame indicator may be information of 1 bit or more (e.g., 2 bits). For example, in case that the scanning frame indicator is '00', the scanning frame indicator may indicate that the PPDU is a data unit that carries the non-scanning frames. In addition, in case that the scanning frame indicator is '01', the scanning frame indicator may indicate that the PPDU is a data unit that carries beacon frames, and in case that the scanning frame indicator is '10', the scanning frame indicator may indicate that the PPDU is a data unit that carries probe request frames. And in case that the scanning frame indicator is '11', the scanning frame indicator may indicate that the PPDU is a data unit that carries probe response frames.

For another example, the scanning frame indicator is 2 bits, and the information indicated by the scanning frame indicator may be different. In case that the scanning frame indicator is '00' and '01', the scanning frame indicator indicates the same as above. However, in case that the scanning frame indicator is '10', the scanning frame indicator may indicate that the PPDU is a data unit that carries probe request frames/probe response frames. Scanning frame indicator '11' may be reserved without being mapped to any information.

If the scanning frame indicator is transmitted through the HE-SIG 740, the scanning frame indicator may be transmitted through a subfield which is included in the HE-SIG 740. Although the scanning frame indicator may be transmitted through a separate subfield only for the scanning frame indicator, the scanning frame indicator may also be transmitted through a subfield for transmitting other information. For example, a specific value of an AID part for indicating the STA included in the HE-SIG 740 may be used for indicating whether a frame transmitted through the PPDU is a scanning frame.

Table 1 below represents that a scanning frame indicator is transmitted through a separate subfield of the HE-SIG 740.

TABLE 1

| bit | field | Number of bits | Description |
| --- | --- | --- | --- |
| HE-SIG | Bx | scanning frame indicator | 1 | For a PPDU carrying a scanning frame: Set to 1 For a PPDU carrying a non-scanning frame: Set to 0 |

Table 2 below represents that a scanning frame indicator is transmitted with being included in a part of a subfield of the HE-SIG 740.

TABLE 2

| bit | field | Number of bits | Description |
| --- | --- | --- | --- |
| HE-SIG Byy~Bzz | Partial AID/ scanning frame indicator | xx | Byy~Bzz Partial AID: Set to the value of the TXVECTOR parameter PARTIAL_AID. Partial AID provides an abbreviated indication of the intended recipient(s) of the PSDU (see 9.17a) Exception: specific partial AID indicates a PPDU carrying a scanning frame |

In case that a scanning frame indicator is transmitted based on a training sequence such as L-LTF 720, L-STF 710, HE-LTF 760 and HE-STF 750, the scanning frame indicator may indicate that a specific training sequence is the scanning frame. For example, in case that the PPDU transmits a scanning frame, the training sequence of the HE-LTF 760 of the PPDU may use a specific sequence. The STA that receives the PPDU may identify whether the PPDU received based on the training sequence of the HE-LTF 760 is carrying a scanning frame. In addition, in case that a scanning frame indicator is 1 bit, the scanning frame indicator may be transmitted through a reserved bit of the L-SIG.

Hereinafter, it is assumed that a scanning frame indicator is transmitted through the HE-SIG 740 in the embodiments of the present invention.

In case that a STA that performs scanning receives a PPDU, the STA may determine whether the received PPDU is a PPDU for carrying a scanning frame based on the scanning frame indicator included in the PPDU header (e.g., the HE-SIG 740) of the received PPDU. If the scanning frame indicator indicates that the received PPDU carries a scanning frame (e.g., a beacon frame or a probe response frame), the STA that performs scanning may decode a field after the HE-SIG 740 and an MPDU. On the other hand, if the scanning frame indicator indicates that the PPDU carries a frame which is not a scanning frame, the STA that performs scanning may stop decoding of fields after the HE-SIG 740. In case of using such a method, unnecessary power consumption of STA may be prevented since unnecessary decoding procedure of STA that performs scanning is omitted, thereby decreasing complexity of frame processing of STA.

Or, an STA in a sleep mode may receive a beacon frame by being switched to an activation mode according to a predetermined cycle in order to receive the beacon frame. Accordingly, the STA switched to an activation mode from a sleep mode may identify a traffic indication map (TIM) by decoding remaining parts (e.g., MPDU) after the field including the scanning frame indicator if the scanning frame indicator of the received PPDU indicates that the received PPDU carries a scanning frame (e.g., a beacon frame). If the STA receives one or more beacon frames, the STA may not perform decoding for the PPDU even in case that the scanning frame indicator indicates carrying the beacon frame of the PPDU.

In case that an STA in a sleep mode is switched to an activation mode and the PPDU which is received by the STA switched to the activation mode carries a probe request frame and a probe response frame, the STA may not perform an additional decoding (decoding for the remaining part after the field including the scanning frame indicator) for the PPDU.

Hereinafter, in the embodiments of the present invention, PPDU process operations performed by an STA that performs active scanning, an STA that performs a passive scanning and an associated STA will be described in detail.

Figure 8:
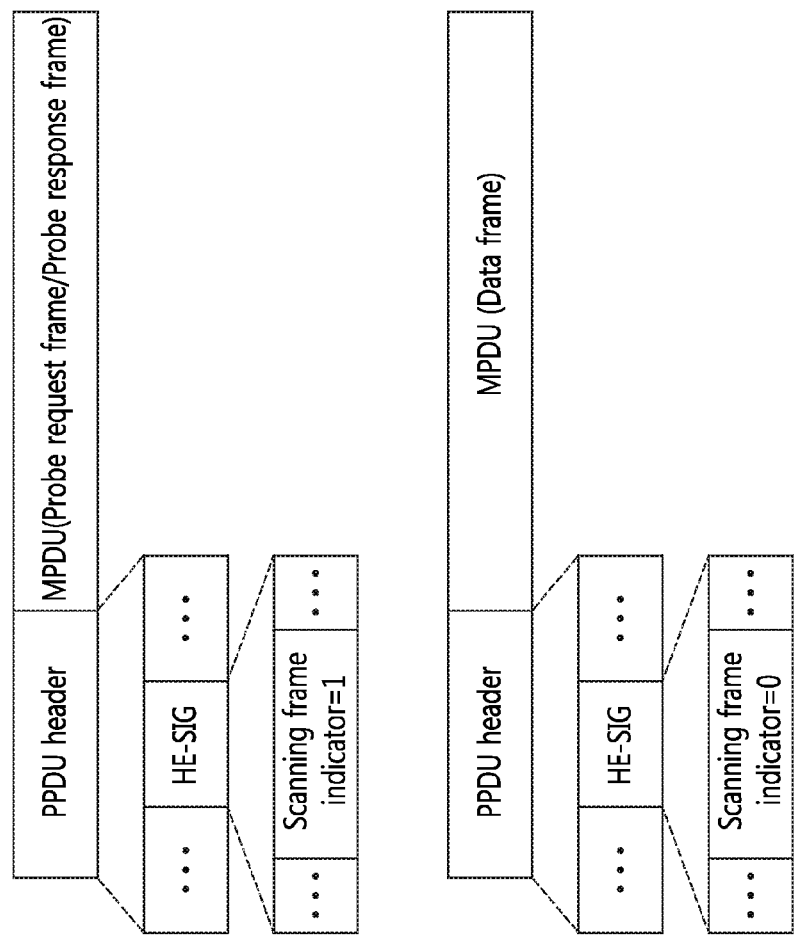
FIG. 8 is a conceptual diagram illustrating a PPDU format according to an embodiment of the present invention.

FIG. 8 is a conceptual diagram illustrating a PPDU format according to an embodiment of the present invention.

FIG. 8 shows a scanning frame indicator separately included in the HE-SIG field.

Referring to an upper part of FIG. 8, in case that a PPDU carries a scanning frame such as a probe request frame, a probe response frame or a beacon frame, the scanning frame indicator may be 1.

Referring to a lower part of FIG. 8, in case that a PPDU carries a non-scanning frame, the scanning frame indicator may be 0.

Figure 9:
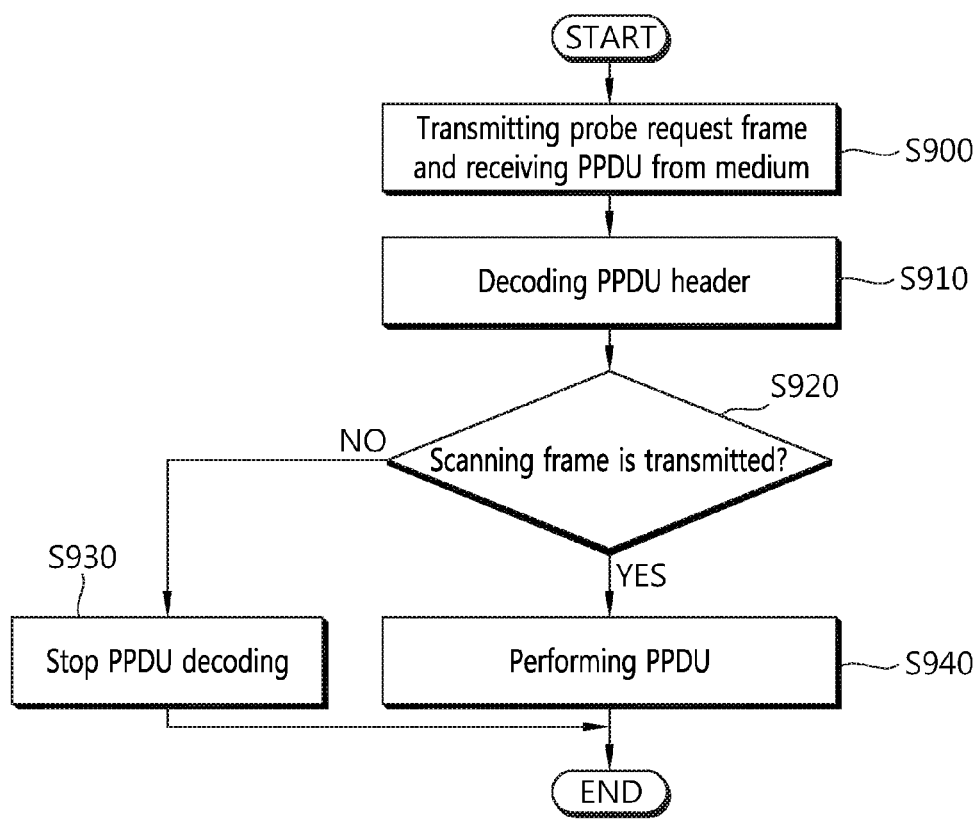
FIG. 9 is a flow chart illustrating a processing procedure of a PPDU of an STA that performs active scanning according to an embodiment of the present invention.

FIG. 9 is a flow chart illustrating a processing procedure of a PPDU of an STA that performs active scanning according to an embodiment of the present invention.

FIG. 9 shows a method of receiving a PPDU header from an AP by an STA, and determining whether the PPDU carries a scanning frame based on the PPDU header by an STA. The STA may determine on whether to perform decoding of data fields based on whether to perform scanning procedure and whether the PPDU carries scanning frames.

Referring to FIG. 9, after transmitting a probe request frame, the STA performs a CCA search and receives a PPDU from a medium (step, S900).

The STA may receive the PPDU through a medium after transmitting the probe request frame based on the active scanning procedure described above by reference to FIG. 5. For example, after transmitting the probe request frame, the STA may search transmission of other frames on a medium until a probe timer reaches a minimum channel time based on the CCA search. In this case, the STA may receive the PPDU by monitoring channels until the probe timer reaches a maximum channel time. Receiving the PPDU may mean receiving the entire or a part (e.g., PPDU header) of the PPDU.

The STA decodes the PPDU header of the received PPDU (step, S910), and determines whether to transmit a scanning frame through the PPDU (step, S920).

In case that the PPDU is the HE format PPDU, a scanning frame indicator may be transmitted to the STA through the PPDU header. The scanning frame may be a probe response frame or a beacon frame. Decoding the PPDU header may mean decoding the entire or a part (e.g., a field including information of the scanning frame indicator) of the PPDU.

In case that the scanning frame is not carried through the PPDU, and decoding of the received PPDU is stopped (step, S930) and in case that the scanning frame is carried through the PPDU, the STA may perform decoding the received PPDU (step, S940).

For example, in case that the scanning frame indicator included in the HE-SIG indicates 1, the STA may continuously perform decoding of a remaining part (e.g., data field (MPDU)) after the HE-SIG of PPDU. On the other hand, in case that the scanning frame indicator indicates 0, the STA may stop (or skip) decoding of the fields after the HE-SIG. That is, in case that the STA performs the scanning procedure and the PPDU carries scanning frames, the STA may determine to decode data fields. On the other hand, in case that the STA performs the scanning procedure and the PPDU does not carry scanning frames, the STA may determine non-decoding in the data fields.

In case that decoding of the fields after the HE-SIG of the STA is stopped, the STA may be switched to a sleep state by being operated in a power saving mode. Otherwise, in case that decoding of the fields after the HE-SIG is stopped, the STA may perform monitoring or processing procedure of other frames.

That is, in case that a scanning frame is not carried through the PPDU, decoding of the next field is stopped (step, S930), and in case that the scanning frame is carried through the PPDU, the STA may perform decoding the next field (step, S940).

Figure 10:
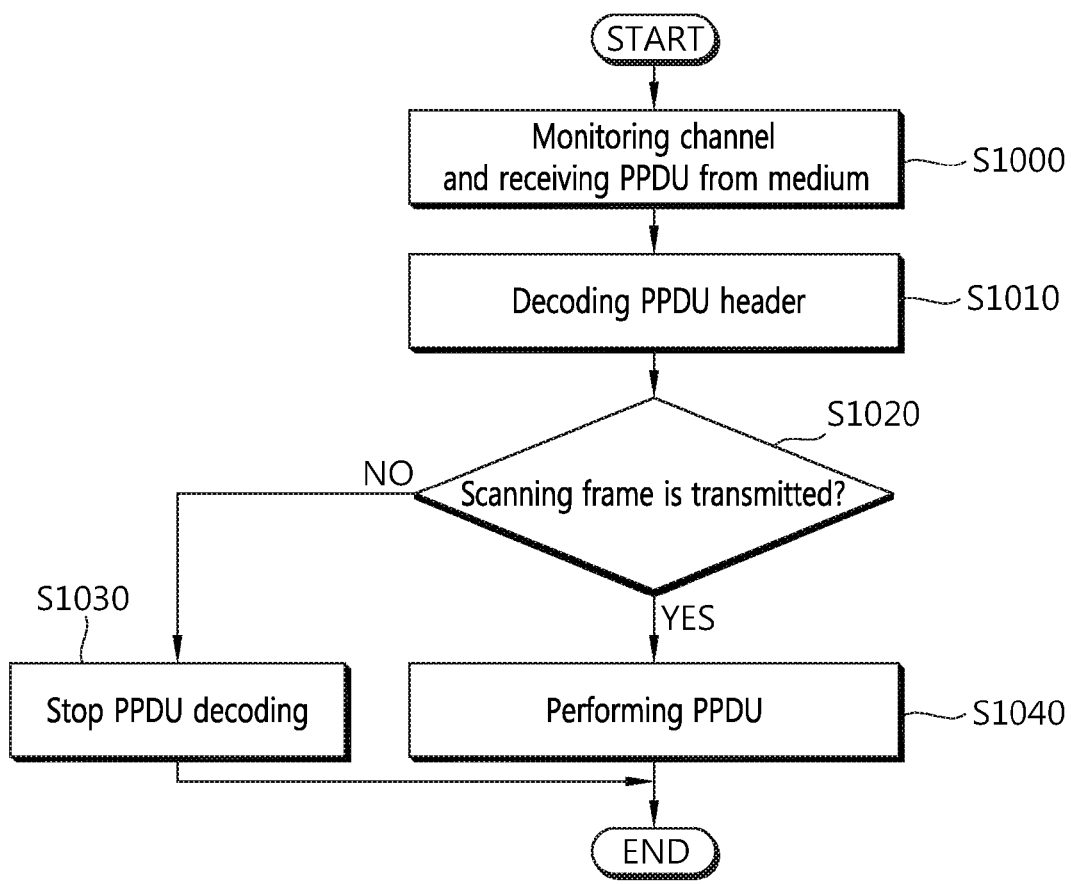
FIG. 10 is a flow chart illustrating a processing procedure of a PPDU of an STA that performs passive scanning according to an embodiment of the present invention.

FIG. 10 is a flow chart illustrating a processing procedure of a PPDU of an STA that performs passive scanning according to an embodiment of the present invention.

Referring to FIG. 10, in case that a scan type parameter indicates a passive scanning, the STA may perform the passive scanning in a range of maximum duration which is defined by a maximum channel time parameter (MaxChannelTimeparameter).

The STA may monitor channels and receive the PPDU through a medium (step, S1000).

The STA that performs a passive scanning for receiving a beacon frame. Receiving the PPDU may means receiving the entire or a part (e.g., PPDU header) of PPDU.

The STA decodes a PPDU header of the received PPDU (step, S1010), and determines whether to carry scanning frames through the PPDU (step, S1020).

The scanning frame indicator may be transmitted through a training field or an SIG field (LTF, STF, SIG, HE-LTF, HE-STF, HE-SIG, etc.) of the PPDU header. The scanning frame may be a probe response frame or a beacon frame. Decoding the PPDU header may mean decoding the entire or a part (e.g., a field including information of the scanning frame indicator) of the PPDU.

In case that a scanning frame is not carried through the PPDU, decoding of the next field is stopped (step, S1030), and in case that the scanning frame is carried through the PPDU, the STA may perform decoding the next field (step, S1040).

It may be assumed that the STA tries to receive a beacon frame and the scanning frame indicator '01' of 2 bits indicates that the PPDU is a data unit for carrying a beacon frame by the PPDU. In this case, for example, decoding for the additional field next to the HE-SIG may be performed only in case that the scanning frame indicator included in the HE-SIG is '01'. On the other hand, in case that the scanning frame indicator included in the HE-SIG is not '01', decoding for the additional field next to the HE-SIG may be stopped. That is, in case that the STA performs the scanning procedure and in case that the PPDU carries the scanning frame (e.g., a beacon frame or a probe response frame), the STA may determine decoding of data fields of the PPDU. On the other hand, in case that the STA performs the scanning procedure and in case that the PPDU does not carry the scanning frame, the STA may determine non-decoding of the data fields.

Similarly, in case that decoding of fields next to the HE-SIG of the STA is stopped, the STA may be switched to a sleep state by being operated in a power saving mode. Or, in case that decoding of fields next to the HE-SIG of the STA is stopped, the STA may perform monitoring other frames or processing procedures.

Figure 11:
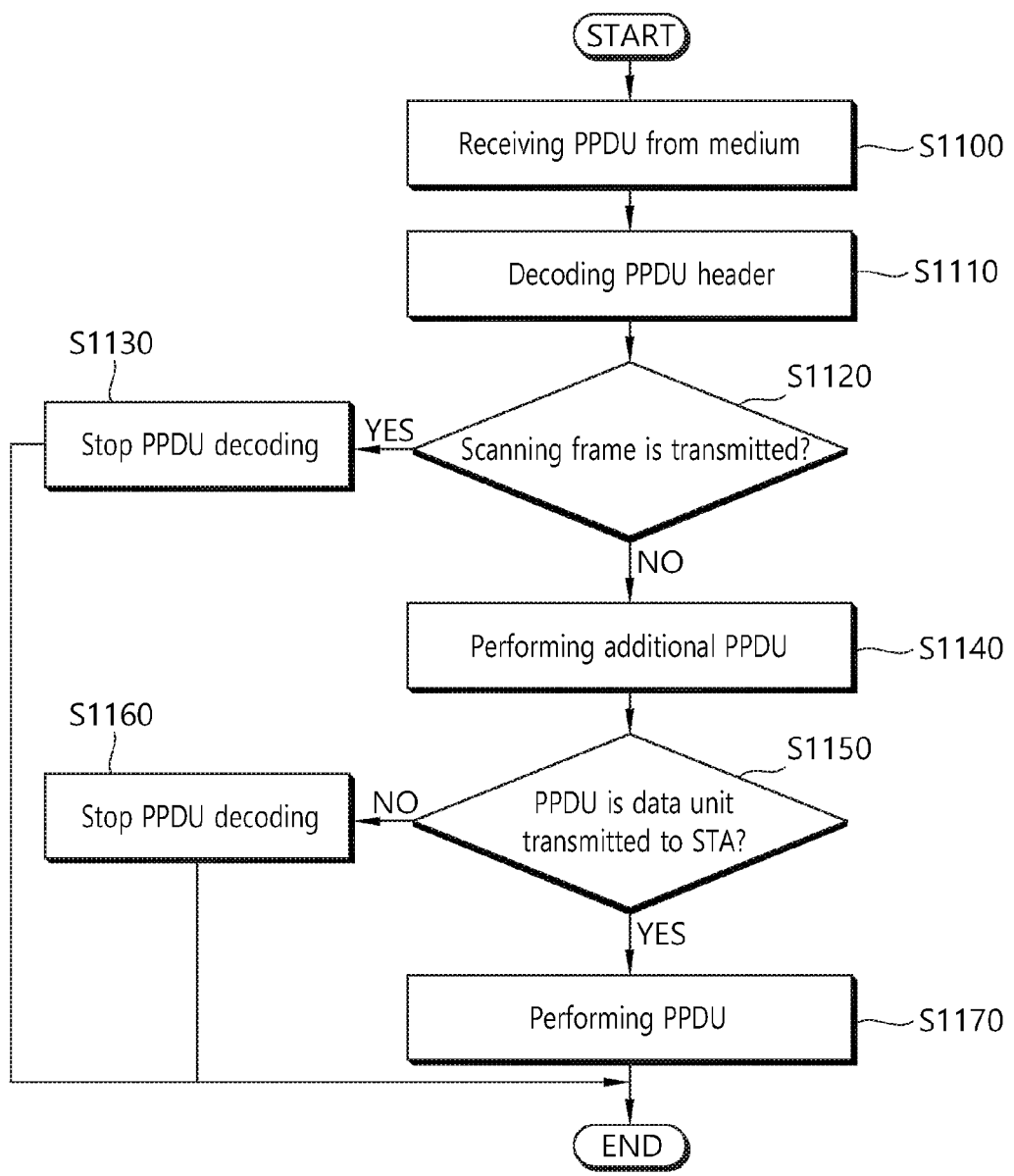
FIG. 11 is a flow chart illustrating a PPDU processing procedure by an STA after completing association according to an embodiment of the present invention.

FIG. 11 is a flow chart illustrating a PPDU processing procedure by an STA after completing association according to an embodiment of the present invention.

Referring to FIG. 11, after associating with an AP, the STA receives the PPDU by searching a medium (step, S1100).

Receiving the PPDU may mean receiving the entire or a part (e.g., PPDU header) of the PPDU.

The STA decodes a PPDU header of the received PPDU (step, S1110), and determines whether the frame transmitted through the PPDU is a scanning frame (step, S1120).

Decoding the PPDU header may mean decoding the entire or a part (e.g., a field including information of the scanning frame indicator) of the PPDU. The PPDU header may include a scanning frame indicator. The scanning frame may be a probe response frame, a probe request frame or a beacon frame.

After the STA associates with the AP, the STA may not need to receive the scanning frame (a probe response frame, a probe request frame or a beacon frame).

If the received PPDU is a scanning frame, the STA may stop decoding for an additional field next to the field that includes the scanning frame indicator (step, S1130). On the other hand, if the received PPDU is not a scanning frame, the STA may additionally perform decoding for an additional field next to the field that includes the scanning frame indicator (step, S1140).

According to an embodiment of the present invention, the STA determines whether the PPDU is a data unit which is transmitted to the STA (step, S1150).

The STA may determine whether to perform an additional decoding based on a partial AID included in the HE-SIG. For example, in case that partial AID information included in the SIG is the same as partial AID information of the STA, the STA may perform decoding for the MPDU (step, S1170). On the other hand, in case that partial AID information included in the SIG is not the same as partial AID information of the STA, the STA may stop decoding for the MPDU (step, S1160).

That is, in case that the STA does not perform the scanning procedure and the PPDU does not carry the scanning frame, the STA may determine whether the PPDU is dedicated to the STA based on the PPDU header. If the PPDU is dedicated to the STA, the STA may determine decoding of the data field. On the other hand, if the PPDU is not dedicated to the STA, the STA may determine non-decoding of the data field.

In case that the received PPDU is a scanning frame or the partial AID of the SIG is not the same as the partial AID of the STA, after stopping decoding for the MPDU, the STA may be switched to a sleep state by being operated in a power saving mode for remaining decoding duration. Or, in case that decoding for a field next to the HE-SIG of the STA is stopped, the STA may also perform other frame monitoring or processing procedure.

Figure 12:
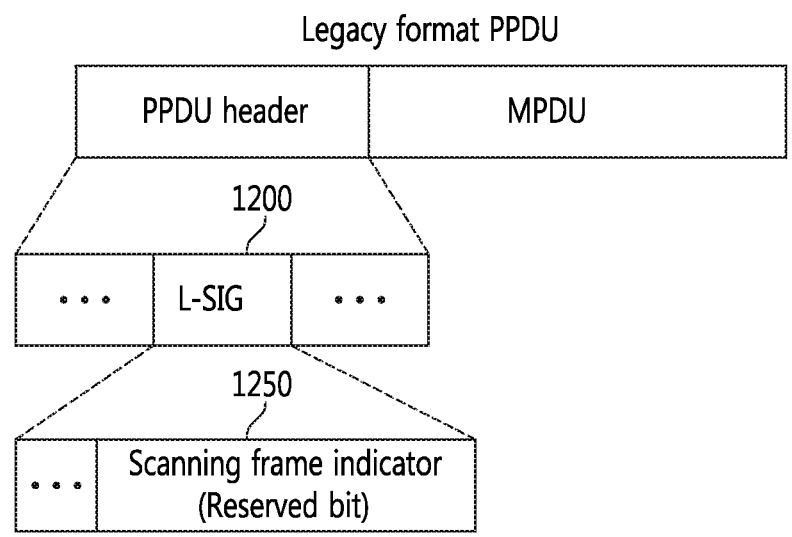
FIG. 12 is a conceptual diagram illustrating a frame format according to an embodiment of the present invention.

FIG. 12 is a conceptual diagram illustrating a frame format according to an embodiment of the present invention.

FIG. 12 shows the case that a scanning frame indicator is transmitted with being included in the L-SIG of the legacy format PPDU.

For example, in case of an STA or an AP that uses the existing legacy format PPDU, when transmitting the legacy format PPDU, a scanning frame indicator may be allocated to a reserved bit of the L-SIG. The legacy format PPDU may mean the existing PPDU (non-HT format PPDU, HT format PPDU or VHT format PPDU).

The scanning frame indicator allocated to reserved bit of the L-SIG may indicate whether the legacy PPDU transmits a beacon frame, a probe response frame or a probe request frame.

Referring to FIG. 12, the L-SIG of the legacy format PPDU may be transmitted with the above described scanning frame indicator being included. As described above, the scanning frame indicator may be information of 1 bit. In case that the scanning frame indicator is '0', the scanning frame indicator may indicate that the decoded PPDU is a data unit that carries a scanning frame. On the other hand, the scanning frame indicator is '1', the scanning frame indicator may indicate that the PPDU is a data unit that carries a non-scanning frame. That is, the scanning frame indicator of 1 bit may be transmitted with being allocated to a reserved bit of the L-SIG of the legacy format PPDU.

Figure 13:
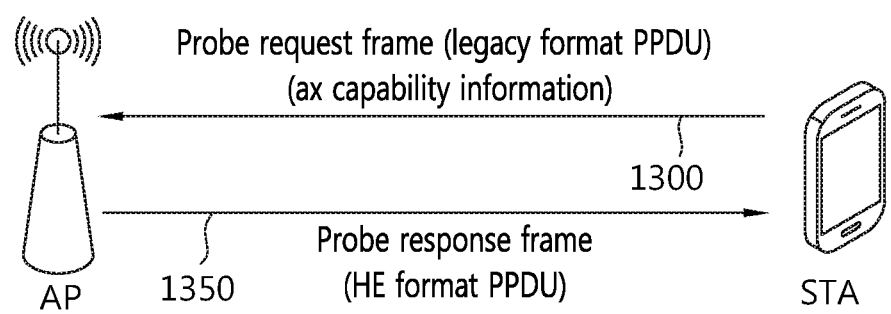
FIG. 13 is a conceptual diagram illustrating a scanning procedure according to an embodiment of the present invention.

FIG. 13 is a conceptual diagram illustrating a scanning procedure according to an embodiment of the present invention.

FIG. 13 shows a scanning operation between APs (ax AP) that support 802.11ax and an STA (ax STA) that supports 802.11ax.

Generally, in case that ax STA is located around an ax AP, the ax STA may perform the scanning procedure by transmitting a scanning frame of the HE PPDU format. However, in case of an ax STA, the STA is unable to notice whether an ax AP is located around. Accordingly, an ax STA may transmit a scanning frame (a probe request frame 1300) through the legacy format PPDU. When transmitting a scanning frame through the legacy format PPDU, the ax STA may transmit the scanning frame with information of capability of the ax STA that may support 11ax. The information of the ax STA's capability that is available to support 11x may be expressed as ax capability information.

The ax AP that receives the PPDU including the ax capability information of the ax STA's capability that is available to support 11ax may transmit a scanning frame (probe response frame) 1350 or a beacon frame to the ax STA through the HE format PPDU.

By using such a method, the 11ax STA may receive the scanning frame from both the legacy AP and the ax AP.

Figure 14:
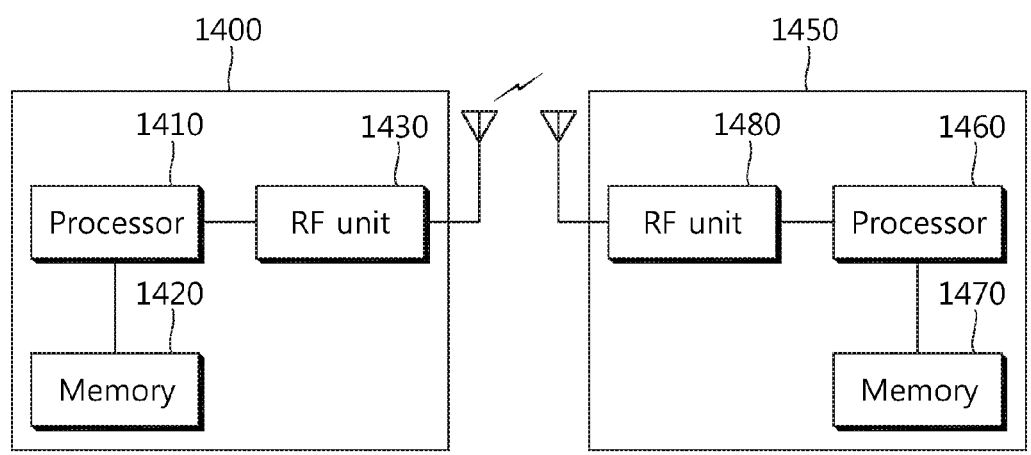
FIG. 14 is a block diagram illustrating a wireless device to which an embodiment of the present invention may apply.

FIG. 14 is a block diagram illustrating a wireless device to which an embodiment of the present invention may apply.

Referring to FIG. 14, the wireless device may be an STA that may implement the above-described embodiments, and the wireless device may be an AP 1400 or a non-AP STA (or STA) 1450.

The AP 1400 includes a processor 1410, a memory 1420, and an RF (Radio Frequency) unit 1430.

The RF unit 1430 may be connected with the processor 1410 to transmit/receive radio signals.

The processor 1410 implements functions, processes, and/or methods as proposed herein. For example, the processor 1410 may be implemented to perform the operation of the above-described wireless device according to an embodiment disclosed in FIG. 7 to FIG. 13 of the present invention.

For example, when generating a scanning frame, the processor 1420 may be implemented to generate the scanning frame such that a scanning frame indicator is apparently or inherently included in the PPDU header.

The STA 1450 includes a processor 1460, a memory 1470, and an RF (Radio Frequency) unit 1480.

The RF unit 1480 may be connected with the processor 1460 to transmit/receive radio signals.

The processor 1460 implements functions, processes, and/or methods as proposed herein. For example, the processor 1460 may be implemented to perform the operation of the above-described wireless device according to an embodiment disclosed in FIG. 7 to FIG. 13 of the present invention.

For example, the processor 1460 may be implemented to receive the PPDU header from an AP, determine whether a PPDU carries a scanning frame based on the PPDU header, and determine whether to perform decoding data fields based on whether to perform the scanning procedure and whether the PPDU carries the scanning frame.

The processor 1410, 1460 may include an ASIC (Application-Specific Integrated Circuit), other chipset, a logic circuit, a data processing device, and/or a converter that performs conversion between a baseband signal and a radio signal. The memory 1420, 1470 may include a ROM (Read-Only Memory), a RAM (Random Access Memory), a flash memory, a memory card, a storage medium, and/or other storage device. The RF unit 1430, 1480 may include one or more antennas that transmit and/or receive radio signals.

When an embodiment is implemented in software, the above-described schemes may be embodied in modules (processes, or functions, etc.) performing the above-described functions. The modules may be stored in the memory 1420, 1470 and may be executed by the processor 1410, 1460. The memory 1420, 1470 may be positioned in or outside the processor 1410, 1460 and may be connected with the processor 1410, 1460 via various well-known means.

What is claimed is:

1. A method for receiving a physical layer (PHY) protocol data unit (PPDU), the method comprising:
   transmitting, by a station (STA), a first PPDU to request first association information to associate with an access point (AP) supporting the STA,
   wherein the first PPDU includes a first PPDU header and a first data field which is a remaining part of the first PPDU after the first PPDU header;
   receiving, by the STA, a second PPDU from the AP, the second PPDU including a first scanning indicator indicating whether a first scanning frame including the first association information is included in a second data field of the second PPDU,
   wherein the first scanning indicator is included in a second PPDU header of the second PPDU;
   determining, by the STA, whether to perform decoding the second data field of the second PPDU based on the first scanning indicator; and
   performing, by the STA, decoding the second data field if the first scanning indicator indicates that the first scanning frame is included in the second data field.

2. The method of claim 1, wherein the PPDU header includes a scanning frame indicator,
   wherein the first PPDU includes a probe request frame, and
   wherein the first scanning frame is a probe response frame received in response to the probe request frame.

3. The method of claim 1,
   wherein the second PPDU header includes a training sequence field, and
   wherein a specific training sequence included in the training sequence field indicates whether the second PPDU carries the first scanning frame.

4. The method of claim 1, further comprising:
   determining, by the STA, to perform non-decoding the second data field, if the first scanning indicator indicates that the first association information is not included in the second data field.

5. The method of claim 1, further comprising:
   receiving, by the STA, a third PPDU including a second scanning indicator indicating whether a second scanning frame including second association information is included in a third data field of the third PPDU from a second AP, after the STA is associated with the AP,
   wherein the second scanning indicator is included in a third PPDU header of the third PPDU;
   determining, by the STA, whether the third PPDU is dedicated to the STA based on the third PPDU header of the third PPDU, if the second scanning indicator indicates that the second association information is not included in the third data field;
   determining to perform decoding the data field, if the third PPDU is dedicated to the STA; and
   determining to perform non-decoding the data field, if the third PPDU is not dedicated to the STA.

6. A STA for receiving a physical layer (PHY) protocol data unit (PPDU), the STA comprising:
   a radio frequency (RF) unit configured to transmit or receive radio signal; and
   a processor operatively connected to the RF unit and configured to:
      transmit a first PPDU to request first association information to associate with an access point (AP) supporting the STA, wherein the first PPDU includes a first PPDU header and a first data field which is a remaining part of the first PPDU after the first PPDU header;
      receive a second PPDU including a first scanning indicator indicating whether a first scanning frame including the first association information is included in a second data field of the second PPDU from the AP, wherein the first scanning indicator is included in a second PPDU header of the second PPDU;
      determine whether to perform decoding the second data field of the second PPDU based on the first scanning indicator; and
      perform decoding the second data field if the first scanning indicator indicates that the first scanning frame is included in the second data field.

7. The STA of claim 6, wherein the first PPDU includes a probe request frame, and wherein the first scanning frame is a probe response frame received in response to the probe request frame.

8. The STA of claim 6,
   wherein the second PPDU header includes a training sequence field, and
   wherein a specific training sequence included in the training sequence field indicates whether the second PPDU carries the first scanning frame.

9. The STA of claim 6, wherein the processor is further configured to:
   determine to perform non-decoding the second data field, if the first scanning indicator indicates that the first association information is not included in the second data field.

10. The STA of claim 6, wherein the processor is further configured to:
    receive a third PPDU including a second scanning indicator indicating whether a second scanning frame including second association information is included in a third data field of the third PPDU from a second AP, after the STA is associated with the AP, wherein the second scanning indicator is included in a third PPDU header of the third PPDU;
    determine whether the third PPDU is dedicated to the STA based on the third PPDU header of the third PPDU, if the second scanning indicator indicates that the second association information is not included in the third data field;

determine to perform decoding the data field, if the third PPDU is dedicated to the STA; and determine to perform non-decoding the data field, if the third PPDU is not dedicated to the STA.

11. The STA of claim 6, wherein the first PPDU includes capability information of the STA, and wherein the second PPDU is configured according to the capability information.

12. A method for receiving a physical layer (PHY) protocol data unit (PPDU), the method comprising:

receiving, by a station (STA), a first PPDU including a first scanning indicator indicating whether a first scanning frame including first association information is included in a first data field of the first PPDU from an access point (AP), wherein the first scanning indicator is included in a first PPDU header of the first PPDU, and wherein the first data field which is a remaining part of the first PPDU after the first PPDU header;

determining, by the STA, whether to perform decoding the first data field of the first PPDU based on the first scanning indicator; and performing, by the STA, decoding the first data field if the first scanning indicator indicates that the first scanning frame is included in the first data field.

13. The method of claim 12, wherein the first PPDU includes a beacon frame transmitted from the AP.

* * * * *